United States Patent
Seo

(10) Patent No.: US 7,065,084 B2
(45) Date of Patent: Jun. 20, 2006

(54) DATA STRUCTURE FOR IMPLEMENTATION OF TRAFFIC ENGINEERING FUNCTION IN MULTIPROTOCOL LABEL SWITCHING SYSTEM AND STORAGE MEDIUM FOR STORING THE SAME

(75) Inventor: Hyun-Chul Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 974 days.

(21) Appl. No.: 09/989,650

(22) Filed: Nov. 21, 2001

(65) Prior Publication Data

US 2002/0071389 A1  Jun. 13, 2002

(30) Foreign Application Priority Data

Dec. 9, 2000  (KR) ............................... 2000-74991

(51) Int. Cl.
  *H04L 12/56* (2006.01)
(52) U.S. Cl. ..................... 370/392; 370/409; 370/429
(58) Field of Classification Search ............... 370/392, 370/428, 429, 409
  See application file for complete search history.

(56) References Cited

U.S. PATENT DOCUMENTS 6,768,738 B1 *  7/2004  Yazaki et al. ............... 370/392
  6,795,445 B1 *  9/2004  Kabie et al. ................ 370/401
  2002/0181485 A1 * 12/2002  Cao et al. ................... 370/419

OTHER PUBLICATIONS

Ahn et al. "Design and Implementation of MPLS Netowrk Simultator Supporting LDP and CR-LDP". IEEE. pp. 441-446.*

Chinese Office Action of the Chinese Patent Application No. 01142794.9 (issued Jan. 2, 2004).
Reference 1: The Implementing Solution of QoS Traffic in MPLS System (dated Apr. 1999).
Reference 2: Analysis on MPLS Technology and Its Application (dated Sep. 2000).

* cited by examiner

*Primary Examiner*—Derrick Ferris
(74) *Attorney, Agent, or Firm*—Robert E. Bushnell, Esq.

(57) ABSTRACT

A data structure for implementing a traffic engineering function in a multiprotocol label switching system comprises: a subscriber profile including a plurality of entries for storing forwarding equivalence class (FEC) information required for setup of a label switched path (LSP) based on the traffic engineering function, the entries of the subscriber profile being sequentially assigned indexes corresponding to one traffic engineering service subscriber identification (ID); a path profile including a plurality of entries for storing respective path information items regarding a type length value (TLV) of a signal protocol required for setup of an explicit routed label switched ath (ER-LSP) based on the traffic engineering function, the entries of the path profile being sequentially assigned indexes corresponding to respective path information items; and a quality of service (QoS) profile including a plurality of entries for storing respective QoS information items regarding a TLV of a signal protocol required for setup of a constraint routed label switched path (CR-LSP) based on the traffic engineering function, the entries of the QoS profile being sequentially assigned indexes corresponding to respective QoS information items. The indexes assigned to the profile entries include a plurality of indexes set by an operator for interlinking corresponding ones of the subscriber profile entries, the path profile entries, and the QoS profile entries.

33 Claims, 11 Drawing Sheets

DATA STRUCTURE FOR IMPLEMENTATION OF TRAFFIC ENGINEERING FUNCTION IN MULTIPROTOCOL LABEL SWITCHING SYSTEM AND STORAGE MEDIUM FOR STORING THE SAME

CLAIM OF PRIORITY

This application makes reference to, incorporates the same herein, and claims all benefits accruing under 35 U.S.C. §119 from my application DATABASE STRUCTURE FOR IMPLEMENTING TRAFFIC ENGINEERING FUNCTION IN MULTIPROTOCOL LABEL SWITCHING SYSTEM AND CONSTRUCTING METHOD THEREOF filed with the Korean Industrial Property Office on Dec. 9, 2000 and there duly assigned Serial No. 74991/2000.

BACKGROUND OF THE INVENTION

1. Technical Field

The present invention relates, in general, to traffic engineering applied to a multiprotocol label switching (MPLS) system and, more particularly, to a data structure for implementation of traffic engineering and a storage medium for storing the same.

2. Related Art

With the demand for Internet access rapidly increasing since the beginning of the 1990's, the need to improve quality and reliability of service has placed a burden on Internet networks, forcing them to depart from the provision of large-scale (or high-speed) and best-effort services, which are conventional key network attributes. Recently, as the Internet has served as the infrastructure of economic activities, Internet service providers (ISPs) have particularly focused on the quality of service (QoS). According to such a trend, ISPs have used an MPLS over ATM (MPOA) system employing an asynchronous transfer mode (ATM) network, or they have added more resources than are desirable onto Internet networks, in order to meet the demand for resources on networks and to stably provide high-quality Internet services. Nevertheless, it is not easy for ISPs to cope with rapidly increasing network traffic. It is also the current reality that the number of users requiring services of high quality is on a continuously increasing trend. As a result, ISPs have given attention to an Internet protocol (IP) traffic engineering technology capable of providing an additional service for efficiently using limited network resources in such a manner that IP traffic is efficiently distributed according to the amount of use, and is then assigned differential resources by services. This system has resulted in the advent of traffic engineering based on an MPLS system.

Unlike existing Internet networks that are of a nonconnection-oriented type, the MPLS system is adapted to control IP traffic by setting up a label switched path (LSP) or connection-oriented logical channel, and by directing the IP traffic to the set-up LSP. The MPLS system has an explicit routed LSP (ER-LSP) setup function and flow categorization function for controlling the allocation and flow of one resource to each traffic. This enables control of IP traffic and the provision of differential services to subscribers, which were previously unable to be conventionally achieved.

The MPLS system typically employs two signal protocols, a constraint-based routing-label distribution protocol (CR-LDP) and resource reservation protocol-traffic engineering (RSVP-TE). Both of these two signal protocols are used for the purpose of transferring label information for label swapping, and the equipment employing them provides an ER-LSP setup/release function performed by an operator, and an LSP protection function for bypassing traffic to an alternate path upon occurrence of a fault after the alternate path is predefined for LSP protection. However, such equipment has a limitation in its ability to provide a variety of additional services, because a forwarding equivalence class (FEC) is determined depending on a destination address in an IP packet header. This makes it difficult to sufficiently reflect rapidly varying requirements of users for a variety of services.

On the other hand, in order to provide the network subscriber with a service of high quality using a traffic engineering function in an MPLS system, the MPLS system has to input FEC information of a subscriber, path information and service associated information. Such information may generally be entered in the MPLS system through any one of the following two exemplary methods. In a first method, respective information is classified according to predefined items and then sequentially entered in the system. In a second method, respective information is configured in the form of entries, which are defined by an operator. Traffic engineering using the MPLS system is then implemented on the basis of the entries.

The above-mentioned methods have a critical disadvantage in that subscriber FEC information, path information and QoS information are not modeled in detail, thereby making it difficult to appropriately manage them and to provide a variety of high-quality services.

SUMMARY OF THE INVENTION

Therefore, the present invention has been developed in view of the above problems, and it is an object of the present invention to provide a data structure for enabling the independent management of respective information necessary for traffic engineering in a multiprotocol label switching system, a computer-readable storage medium for storing the data structure, and a high-quality traffic engineering service using the data structure.

It is another object of the present invention to provide a data structure for enabling the convenient management of respective information necessary for traffic engineering in a multiprotocol label switching system, a computer-readable storage medium for storing the data structure, and a high-quality traffic engineering service using the data structure.

It is still another object of the present invention to provide a data structure for enabling the provision of a variety of traffic engineering services in a multiprotocol label switching system, a computer-readable storage medium for storing the data structure, and a high-quality traffic engineering service using the data structure.

It is yet another object of the present invention to provide a data structure for enabling the provision of differential services of high quality in a multiprotocol label switching system, a computer-readable storage medium for storing the data structure, and a high-quality traffic engineering service using the data structure.

In accordance with the present invention, the above and other objects can be accomplished by the provision of a data structure for implementing a traffic engineering function in a multiprotocol label switching system, the data structure comprising: a subscriber profile including a plurality of entries for storing forwarding equivalence class (FEC) information required for setup of a label switched path (LSP) based on the traffic engineering function, the entries of the subscriber profile being sequentially assigned indexes corresponding to one traffic engineering service subscriber identification (ID); a path profile including a plurality of entries for storing respective items of path information regarding a type length value (TLV) of a signal protocol required for setup of an explicit routed label switched path (ER-LSP) based on the traffic engineering function, the entries of the path profile being sequentially assigned indexes corresponding to the respective items of path information; and a quality of service (QoS) profile including a plurality of entries for storing respective items of QoS information regarding a TLV of a signal protocol required for setup of a constraint routed label switched path (CR-LSP) based on the traffic engineering function, the entries of the QoS profile being sequentially assigned indexes corresponding to the respective items of QoS information.

Preferably, the indexes assigned to the profile entries include a plurality of indexes set by an operator for interlinking corresponding ones of the subscriber profile entries, path profile entries and QoS profile entries.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE PREFERRED EMBODIMENTS

Figure 1:
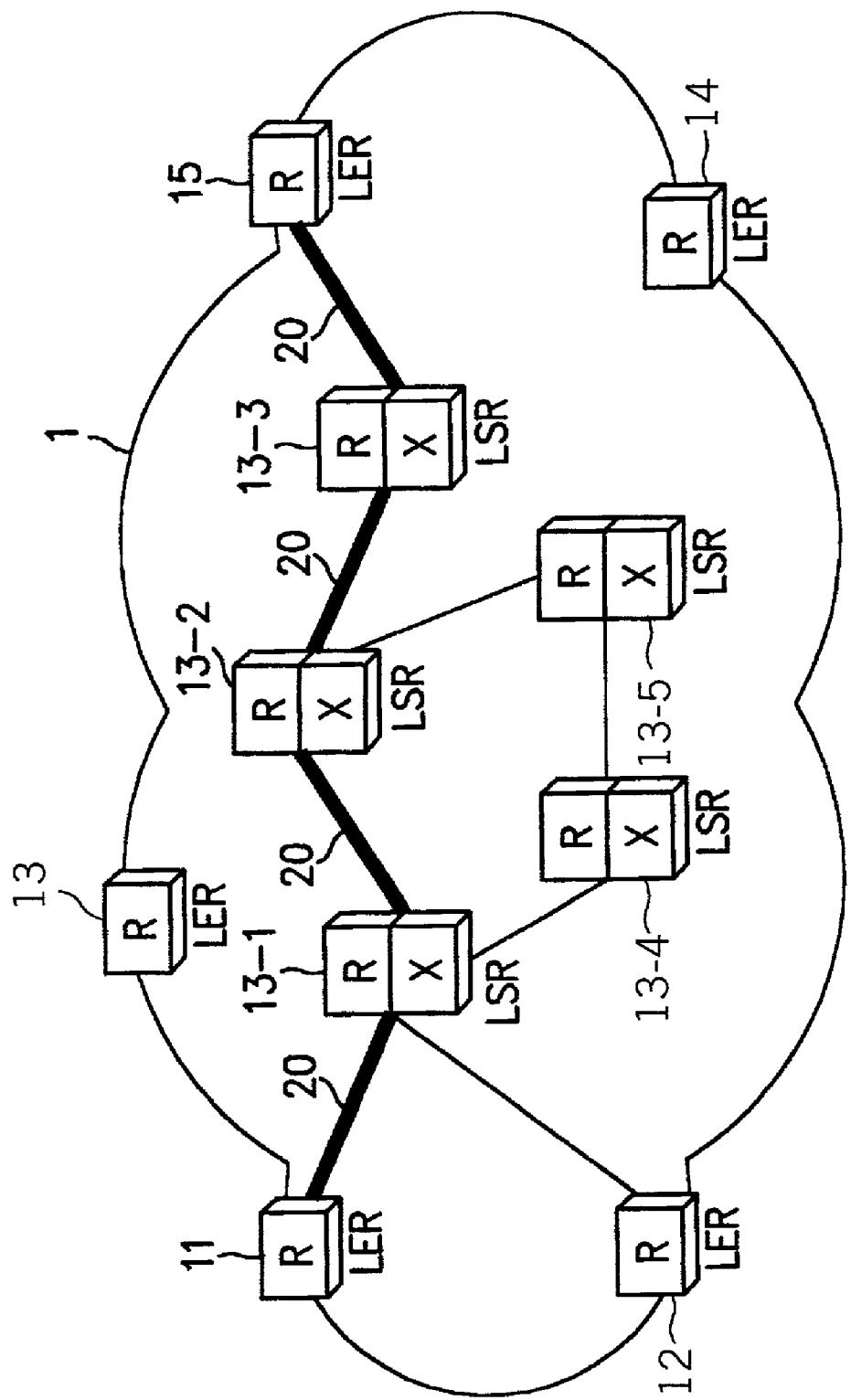
FIG. 1 is a view showing the construction of a multiprotocol label switching (MPLS) network to which the present invention is applied.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention unclear.

FIG. 1 is a view showing the construction of a multiprotocol label switching (MPLS) network to which the present invention is applied. An MPLS system typically employs an Internet protocol (IP)/asynchronous transfer mode (ATM) high-speed multiservice switching technique to rapidly process existing local area network (LAN) traffic and Internet traffic, and to provide a variety of additional services. This MPLS system is adapted to transfer an IP packet by adding an ATM high-speed multiservice switching function to a basic and existing routing function. The MPLS system is directed toward provision of various additional services with high-speed data transfer in large-scale networks, and is appropriate to provision of a high-quality traffic engineering service. As shown in FIG. 1, the MPLS network 1 comprises a plurality of label edge routers (LERs) 11 thru 15 and a plurality of label switch routers (LSRs) 13-1, 13-2, 13-3, 13-4 and 13-5. The LERs 11 thru 15 are located along the edge of the MPLS network 1 to interact with any communication networks other than the MPLS network 1, and the LSRs 13-1 thru 13-5 are located within the MPLS network 1. If a certain one of the LERs, for example, LER 11, receives an IP packet from any other network adjoining the MPLS network 1, then it analyzes a header of the received IP packet and, from the analyzed result, determines a label switched path (LSP) 20 to a destination LER, for example, LER 15, to which the received IP packet is to be transferred. The LSP 20 is a logical path used to transfer data with a specific FEC through the LSRs in the MPLS network. Thereafter, the LER 11 appends a label corresponding to the determined LSP 20 to the received IP packet, and sends the resulting IP packet to the LSR 13-1 existing on the LSP 20. Upon receiving the labeled packet, the LSR 13-1 checks only the label of that packet to change its value, and then sends the resulting packet to the next LSR 13-2 placed on the determined LSP 20. Finally, the LER 15 receives the IP packet via the LSP 20, removes the label from the received IP packet, and then transfers the resulting packet to its destination. In the MPLS network 1, the LSP is set up on the basis of a transfer path determined according to a packet by an LER, as stated above. An operator provides the LER with a function capable of selectively setting up an explicit routed path and a function capable of appropriately allocating network resources to a set-up LSP, thereby implementing a traffic engineering function.

Figure 2:
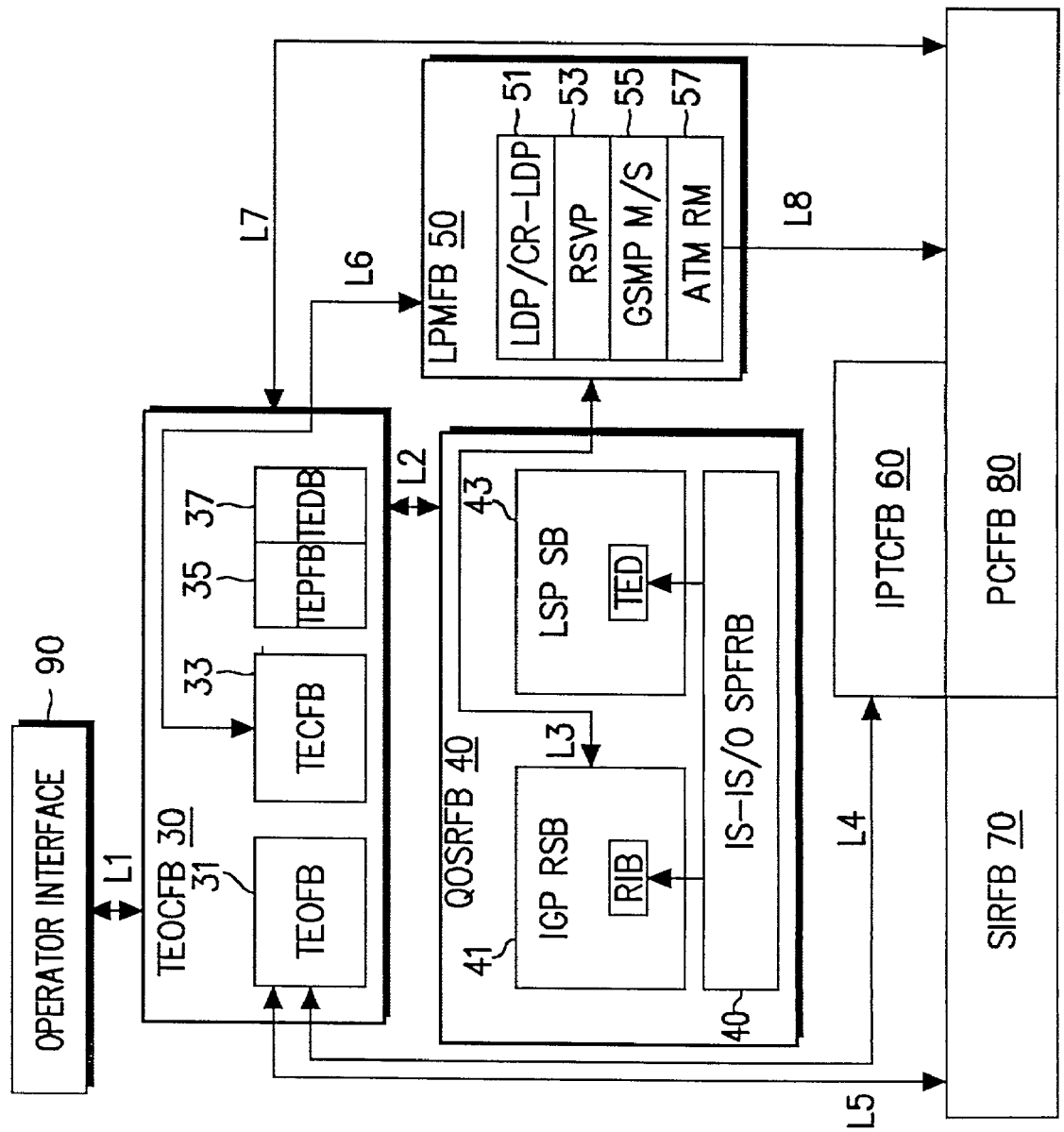
FIG. 2 is a block diagram of a label edge router (LER) to which the present invention is applied.

FIG. 2 is a functional block diagram of the LER for implementation of the traffic engineering function in accordance with the present invention. As shown in this drawing, the LER includes a traffic engineering operating and controlling function block (TEOCFB) 30, quality of service routing function block (QoSRFB) 40, LSP path management function block (LPMFB) 50, Internet packet traffic controlling function block (IPTCFB) 60, subscriber interconnecting and recognition function block (SIRFB) 70, packet classifying and forwarding function block (PCFFB) 80, and operator interface 90.

Figure 3A:
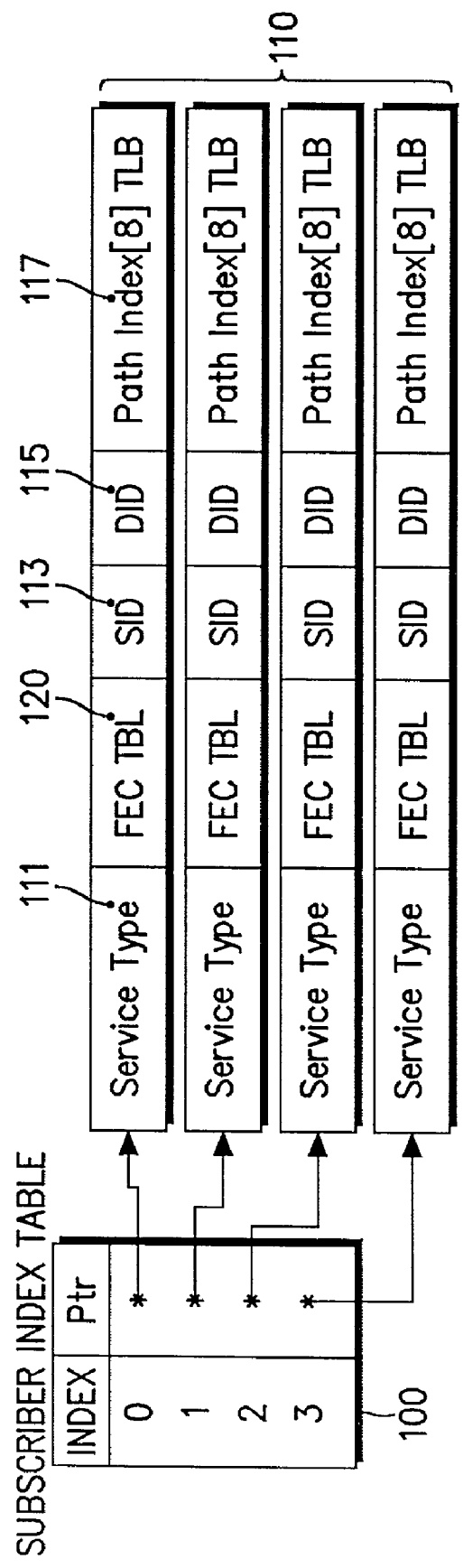
FIG. 3A is a view showing the respective structures of a subscriber index table and a subscriber profile in accordance with the present invention.
Figure 3B:
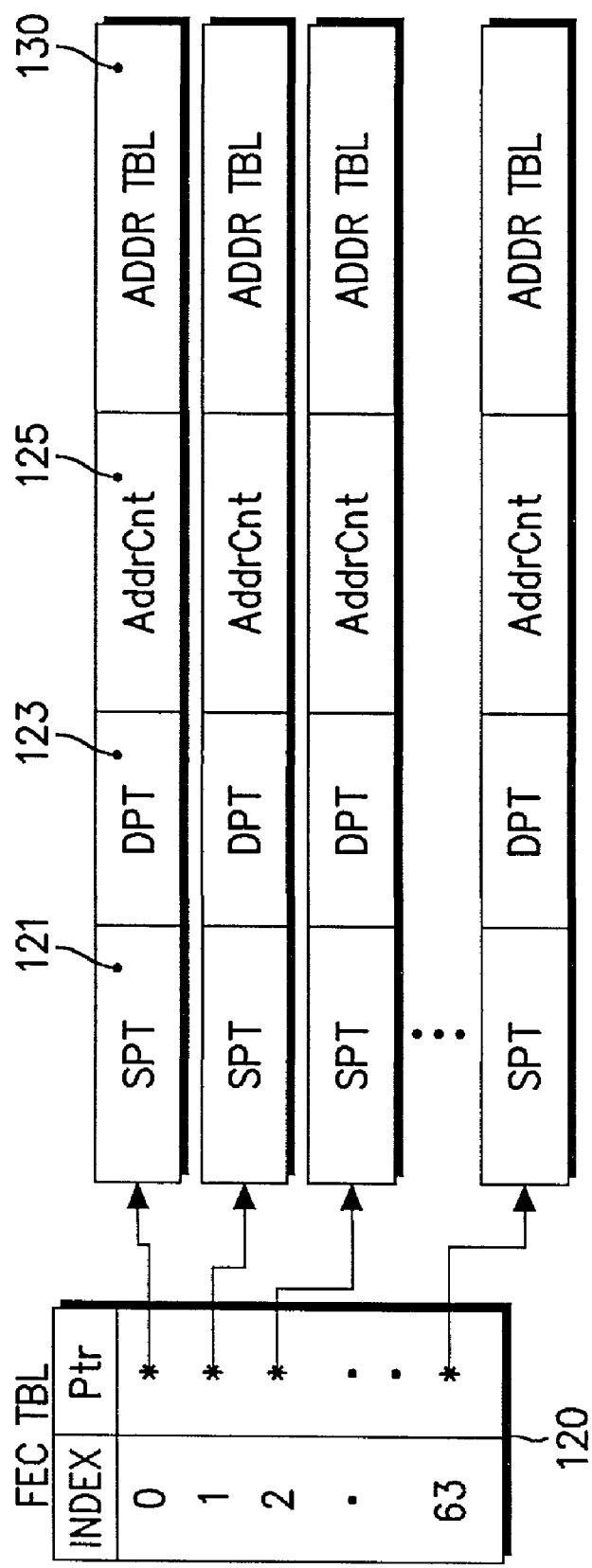
FIG. 3B is a view showing the structure of a forwarding equivalence class (FEC) table as a sub-table of the subscriber profile in accordance with the present invention.
Figure 3C:
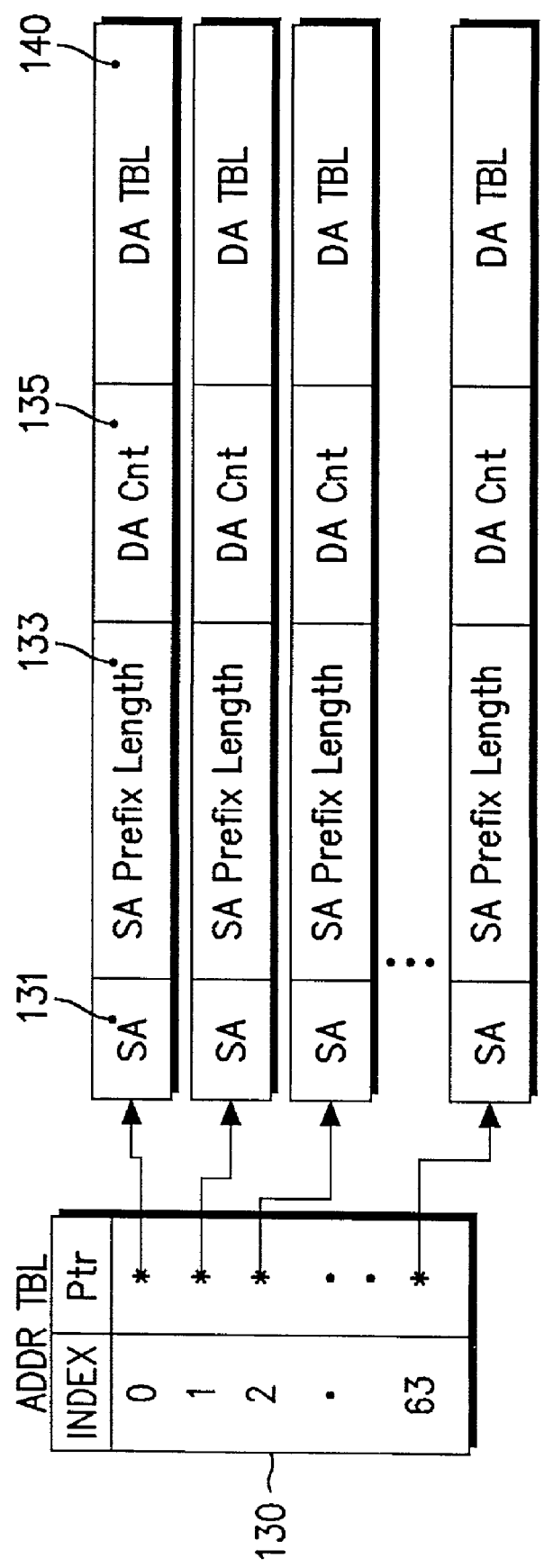
FIG. 3C is a view showing the structure of an address table as a sub-table of the FEC table in accordance with the present invention.
Figure 3D:
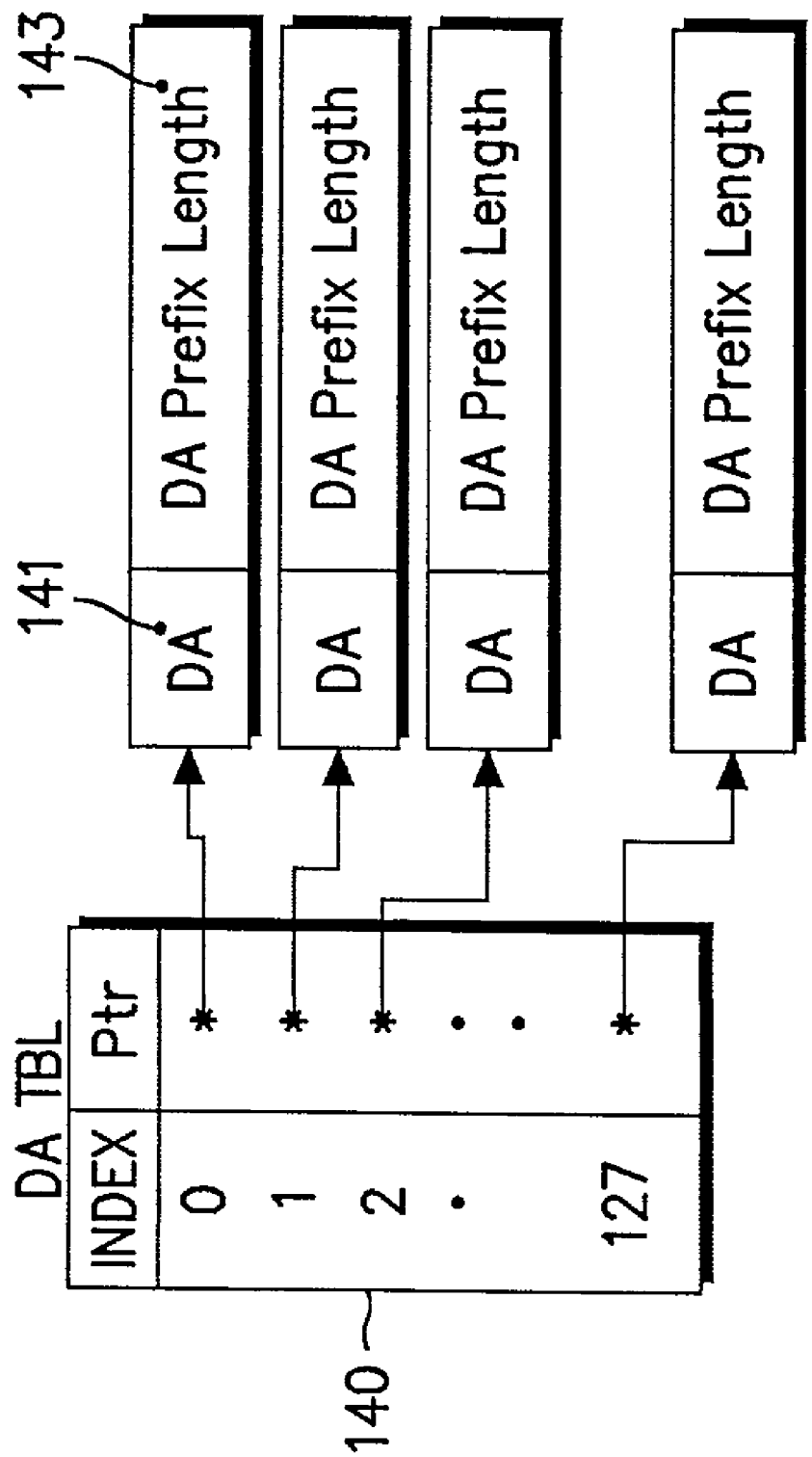
FIG. 3D is a view showing the structure of a destination address table as a sub-table of the address table in accordance with the present invention.
Figure 4:
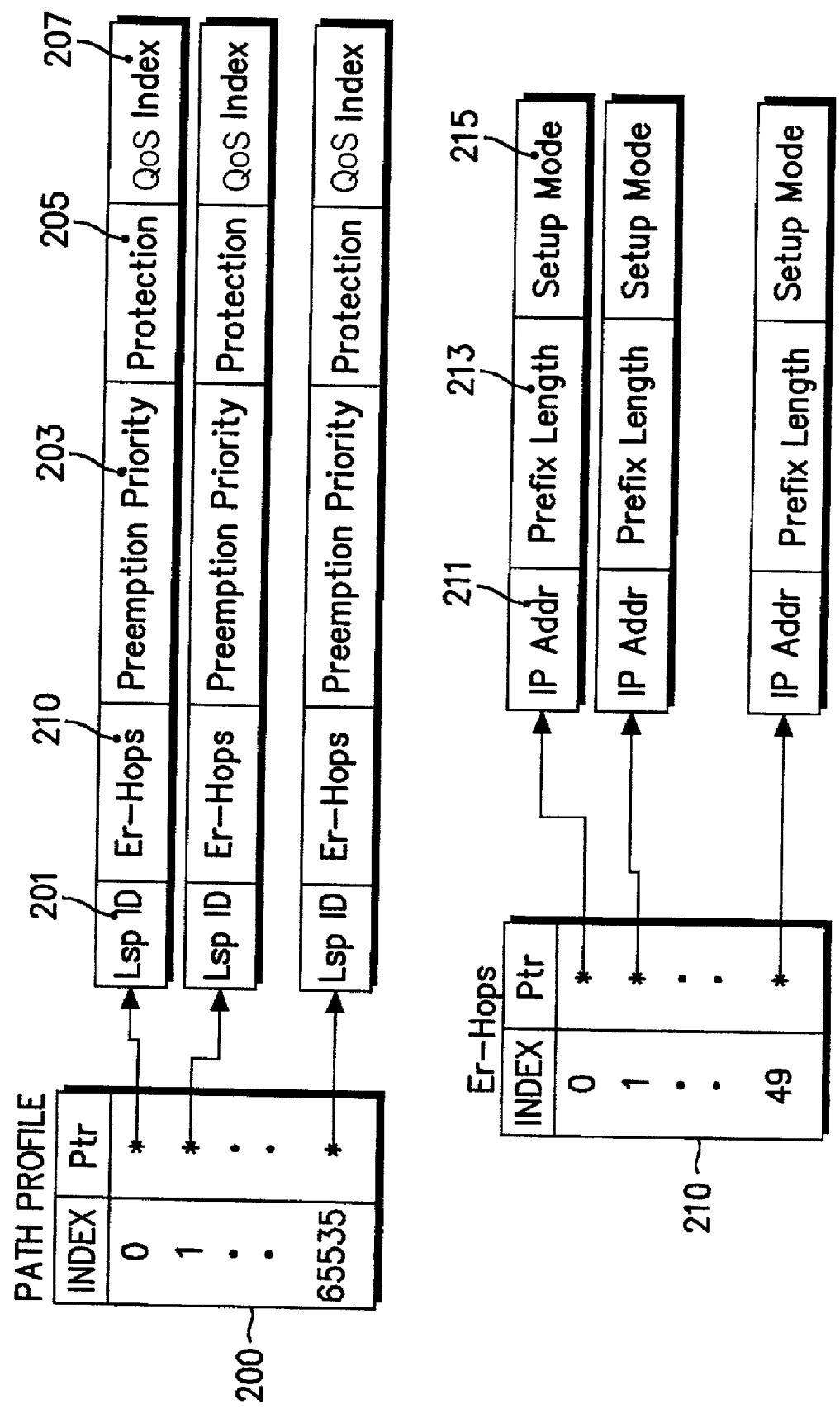
FIG. 4 is a view showing the structure of a path profile in accordance with the present invention.
Figure 5:
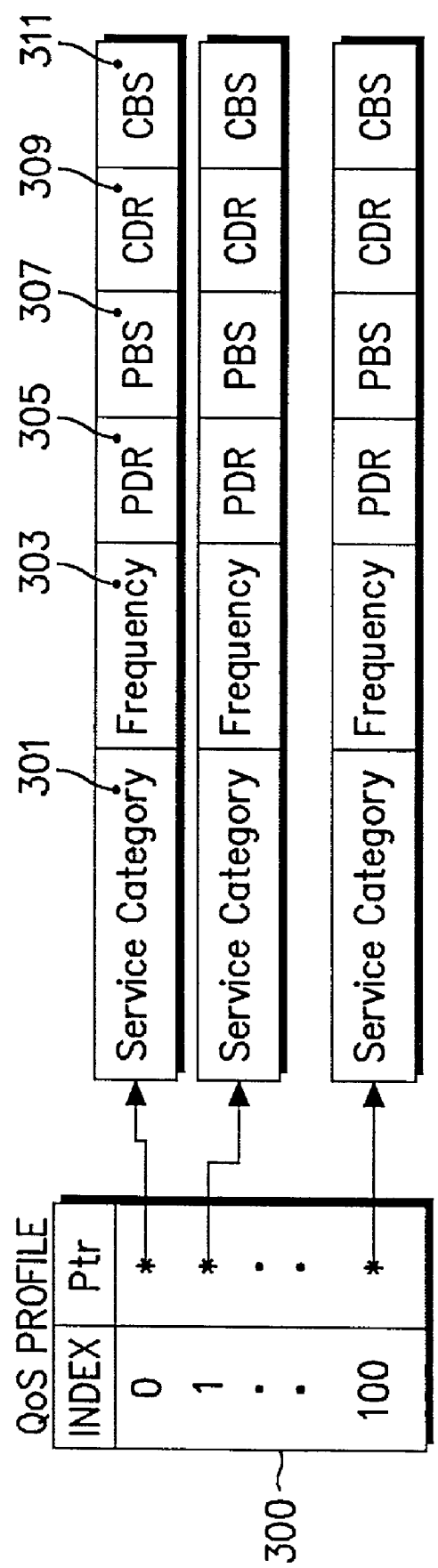
FIG. 5 is a view showing the structure of a quality of service (QoS) profile in accordance with the present invention.

The TEOCFB 30 is provided with a traffic engineering operating function block (TEOFB) 31, traffic engineering controlling function block (TECFB) 33, traffic engineering profile management function block (TEPFB) 35, and traffic engineering database block (TEDB) 37. The TEOFB 31 functions to manage a service profile in response to a subscriber's request, such as service subscription/release/update. The TEOFB 31 also functions to generate traffic trunk attributes by translating service attributes of subscribers into the traffic trunk attributes, and to determine ER-LSP specifications defining an ER-LSP standard corresponding to the traffic trunk attributes. The TEOFB 31 further functions to collect statistical measurements by LSPs, and to manage information of LSPs. The TECFB 33 functions to perform offline a CR-LSP calculation and a path calculation for path reoptimization using collected network state and performance information. The TECFB 33 also acts to perform a reoptimization function for path resetup and a QoS policy function for provision of a network provider's QoS and policy. The TECFB 33 further acts to control the operations of multiple ER-LSPs belonging to the same FEC, and an ER-LSP routing operation resulting from a network node or link failure. Furthermore, the TECFB 33 is adapted to perform an ER-LSP operation/management function for ER-LSP protection and management for the improvement in ER-LSP reliability, and a further function for configuring and managing an MPLS traffic engineering management information base. The TEDB 37 is provided to store data associated with the provision of an effective traffic engineering service according to the present invention. Subscriber information and service information stored in the database are classified into three profile models, and are then modeled into two-dimensional tables. These profiles are, preferably, a subscriber profile, a path profile and a QoS profile. The subscriber profile includes FEC information to be referred to for implementation of a service for the traffic engineering function. A subscriber index table is provided to manage a subscriber's identification (ID) and a subscriber profile associated with the ID, and its configuration will be described later in detail with reference to FIGS. 3A to 3D. The path profile includes explicit routed (ER)-hop list information, and its configuration is shown in FIG. 4. The QoS profile includes QoS information regarding a CR-LDP or RSVP-TE signal protocol, and its configuration is shown in FIG. 5. The TEPFB 35 is provided to manage the respective profiles according to the present invention. That is, the TEPFB 35 stores information entered by an operator, and necessary for traffic engineering, in the respective corresponding profiles, or it manages deletion of specific information in the profiles, interlinking of the profiles, release thereof, and so forth.

The QoSRFB 40 is provided with an interior gateway protocol route selecting block (IGPRSB) 41 which comprises a routing information base (RIB), an LSP path selecting block (LSPSB) 43 including a traffic engineering database (TED) for storing network topology information and network link attributes information, and an intermediate-system-to-intermediate-system/open shortest path forwarding routing block (IS-IS/OSPFRB) 45 for forwarding routing information. The QoSRFB 40 functions to distribute QoS metric information to an IP hierarchy using a routing protocol, such as IS-IS or OSPF extensions. The QoSRFB 40 also acts to manage the QoS metric information distributed by IS-IS or OSPF extensions protocol, and to calculate LSPs by QoS online using the managed QoS metric information.

The LPMFB 50 is provided with an LDP/CR-LDP 51, an RSVP 53, a general switch management protocol management/switch control (GSMP M/S) 55, and an asynchronous transfer mode resource management (ATM RM) 57. The LPMFB 50 is adapted to perform a CR-LSP setup function and a CR-LSP maintenance function through the interoperation of the LDP/CR-LDP 51, RSVP 53, GSMP M/S 55 and ATM RM 57. The CR-LSP setup function includes a CR-LSP setup/release function, a traffic parameter matching function for matching traffic engineering parameters of ER-LSPs with ATM traffic control parameters, and a GSMP function for ATM resources management and switch control. The CR-LSP setup/release function is carried out according to a signal protocol. The traffic parameter matching function is carried out to define the correspondences of traffic engineering parameters by ER-LSPs requested for setup/release (maximum/average bandwidths, maximum allowable burst size, etc.) with ATM traffic control parameters (maximum/average cell rates, ATM traffic types [CBR, UBR, VBR and so forth], etc.), and to translate the traffic engineering parameters into the ATM traffic control parameters on the basis of the defined correspondences. The GSMP function is carried out in order to request an ATM switch controller to allocate appropriate ATM resources to the ATM traffic control parameters translated by the traffic parameter matching function. On the other hand, the CR-LSP maintenance function is performed in order to maintain information regarding the state and properties of a set-up CR-LSP.

The IPTCFB 60 is adapted to perform a class-based queue function of managing and scheduling a buffer on the basis of a class-based queue in the IP hierarchy, a scheduling function, a congestion control function considering a service grade, and a traffic-by-subscribers/services monitoring control function. The class-based queue function is carried out to classify packets according to service classes, and to buffer and schedule the classified packets, so as to provide differential services according to the service classes. This class-based queue function is also required for realization of a per-hob behavior (PHB). The congestion control function is carried out to discard a given IP packet in consideration of its service grade, thereby making it possible to partially guarantee service quality by service grades, even in a traffic congestion state which occurs for a brief period of time. The traffic-by-subscribers/services monitoring control function is carried out in order to monitor traffic by destination addresses or subscribers so as to introduce, into an MPLS, domain traffic conforming to traffic characteristics agreed to upon service subscription.

The SIRFP 70 is adapted to perform a subscriber interconnecting function and a subscriber recognition function. The subscriber interconnecting function is carried out to make a subscriber interconnection via a logical interface. The subscriber recognition function is carried out to recognize a subscriber via a logical interface.

In FIG. 2, L1 denotes an operator command interface between the operator interface 90 and the TEOCFB 30. The operator command interface L1 is defined for a service/subscriber relevant command, a calculation relevant command for ER-/CR-LSP selection, and a command related to an ER-/CR-LSP setup/resetup/modification/release. L2 denotes an interface for ER-/CR-LSP selection between the TEOCFB 30 and the QoSRFB 40. The interface L2 is defined to allow an operator to find a possible ER-/CR-LSP in the current network state before setting up a specific ER-/CR-LSP. L3 denotes an interface, associated with ER-/CR-LSP setup based on QoS routing, between the IGPRSB 41 and the LPMFB 50. The interface L3 is defined to set up an ER-/CR-LSP on the basis of QoS routing. The interface L3 is further defined to reset up or modify a previously set-up ER-/CR-LSP on the basis of QoS routing as needed. L4 denotes an IP traffic control interface between the TEOFB 31 and the IPTCFB 60. The IP traffic control interface L4 is defined to set parameters necessary for traffic control and reflecting a policy necessary for the traffic control. L5 denotes a subscriber interconnection/recognition interface between the TEOFB 31 and the SIRFP 70. The subscriber interconnection/recognition interface is defined to transfer information for permission of subscriber interconnection and information for subscriber recognition via a logical interface. L6 denotes an ER-/CR-LSP setup associated interface between the TECFB 33 and the LPMFB 50. The ER-/CR-LSP setup associated interface L6 is defined to set up or release an ER-/CR-LSP through a CR-LDP or RSVP, and to modify or reset up a previously set-up ER-/CR-LSP as needed. L7 and L8 denote a forwarding table configuration interface between the TEOCFB 30 and the PCFFB 80, and a forwarding table configuration interface between the LPMFB 50 and the PCFFB 80, respectively. The forwarding table configuration interface L7 is defined for system resources associated information necessary for the configuration of a forwarding table, and the forwarding table configuration interface L8 is defined for subscriber/service information necessary for the configuration of the forwarding table. That is, the interfaces L7 and L8 are defined to transfer data required for the configuration of the forwarding table, and to add/delete/modify entries in the forwarding table.

The subscriber profile, the path profile and the QoS profile, which are stored in the TEDB 37 according to the present invention, have a significant interrelationship through interlinking provided by the TEPFB 35 based on inputs by an operator. Information of the related profiles are used for ER-/CR-LSP setup, release and modification. The explicit routing LSP (ER-LSP) is an LSP set up to explicitly represent all nodes from a source of an IP packet to a destination thereof, and the constraint routed LSP (CR-LSP) is an LSP set up to meet various management restrictions imposed by a manager.

Next, a detailed description will be given of the structures of the subscriber profile, the path profile and the QoS profile according to the present invention with reference to FIGS. 3 to 5. The structure of the subscriber profile will first be described with reference to FIGS. 3A to 3D. FIG. 3A shows the structures of a subscriber index table and the subscriber profile in accordance with the present invention, and FIG. 3B shows the structure of a forwarding equivalence class table (referred to hereinafter as "FEC TBL"), which is a sub-table of the subscriber profile in accordance with the present invention. FIG. 3C shows the structure of an address table (referred to hereinafter as "ADDR TBL"), which is a sub-table of the FEC TBL in accordance with the present invention. FIG. 3D shows the structure of a destination address table (referred to hereinafter as "DA TBL"), which is a sub-table of the ADDR TBL in accordance with the present invention.

Referring to FIG. 3A, the subscriber index table 100 is provided to manage an ID of a traffic engineering service subscriber. In the present embodiment, the number of entries of the subscriber profile 110 manageable by one subscriber ID for the provision of various services to the subscriber is four at a maximum. One subscriber profile entry is generated for one service desired by the subscriber. Provided that more than four services are desired by the subscriber, a new ID will be assigned to the subscriber, and new entries of the subscriber profile 110 will be generated. The subscriber profile 110 is sequentially assigned indexes, not assigned upon entry generation. This profile 110 has actual information for the provision of service to the traffic engineering subscriber.

Each entry of the subscriber profile 110 is composed of a service type field 111, FEC TBL field 120, source address ID (SID) field 113, destination address ID (DID) field 115, and path index table (Path Index[8] TBL) field 117.

The service type field 111 is used to store information about a service type desired by the subscriber, which is considered in view of a network service. The service type may, preferably, be set to any one of a best-effort service, emulated leased line service, and real-time service.

The SID field 113 and DID field 115 are used to store unique 65-bit IDs, which are assigned to a source address and destination address, respectively, extracted from a header of an IP packet, when the packet cannot be forwarded by only a longest prefix matching (LPM) method for the source and destination addresses. These IDs are information applied only for the emulated leased line service.

In the present embodiment, one subscriber profile 110 has a maximum of eight path profile entries. The Path Index[8] TBL field 117 stores indexes of path profile entries linked to the subscriber profile together with its self-indexes. The self-indexes of the Path Index[8] TBL field 117 are used to indicate priorities of path profile entries with information about paths along which traffic associated with a given service is transferred. The path information of the path profile entry having a priority indexed with the number 0 is information of an active path currently applied to the given service. The path information of the path profile entries having priorities indexed with the remaining numbers of 1 to 7 is information relative to bypass paths for path protection, which are normally in a standby state. These bypass paths are set up by an operator in order to bypass traffic upon occurrence of a path fault. If necessary, FEC information regarding the bypass information is referred to, and then transferred to, a forwarding engine (FE). An information base manager (IBM) manages label information defined when setting up an LSP corresponding to the active path information or bypass path information.

Referring to FIG. 3B, the FEC TBL field 120 is provided to manage a subdivided version of the subscriber FEC information. To this end, the FEC TBL field 120, preferably, has a maximum of 64 entries per subscriber profile entry. These entries are sequentially assigned indexes. The FEC TBL field 120 is composed of a source port number (S PT) field 121, destination port number (DPT) field 123, address entry count (AddrCnt) field 125, and ADDR TBL field 130.

The SPT field 121 and DPT field 123 are used to store numbers of ports available in a higher-order application program for the real-time service. Such port numbers may, for example, be transmission control protocol (TCP)/user datagram protocol (UDP) port numbers. The AddrCnt field 125 is used to indicate the number of entries in the ADDR TBL field 130 and having address information of corresponding FEC information.

Referring to FIG. 3C, the ADDR TBL field 130, which is a sub-table of the FEC TBL field 120, is provided to store information about a source address and a destination address of the subscriber. The ADDR TBL field 130 is composed of a source address (SA) field 131, source address (SA) Prefix Length field 133, destination address entry count (DA Cnt) field 135, and DA TBL field 140. The SA field 131 is used to store an IP address of a host or a network to which the subscriber belongs. The SA Prefix Length field 133 is used to express a prefix length of a corresponding source address in a bit unit. The DA Cnt field 135 is used to indicate the number of entries in the DA TBL field 140, regarding destination addresses, when traffic sent from one source address arrives at a plurality of destinations.

Referring to FIG. 3D, the DA TBL field 140, which is a sub-table of the ADDR TBL 130, is designed to designate a maximum of 128 destinations per source address, and has a plurality of indexed entries. The DA TBL field 140 is composed of a destination address (DA) field 141 and a destination address (DA) prefix length field 143. The DA field 141 is used to store an IP address of a host or a network at which traffic of a given service is to arrive. The DA prefix length field 143 is used to express a prefix length of a corresponding destination address in a bit unit.

As stated above, according to this invention, the subscriber profile has a field structure meeting a variety of service requirements. Further, as seen from FIGS. 3A to 3D, the subscriber profile and the sub-tables thereof are managed on the basis of indexes assigned to entries, thereby enabling an operator to readily control specific information with only its index.

FIG. 4 is a view showing the structure of a path profile in accordance with the present invention. A description will hereinafter be given of the structure of the path profile 200 and the structure of an explicit routed (ER)-hop table (referred to hereinafter as "Er-Hops"), which is a sub-table of the path profile 200. The path profile 200 includes a plurality of entries, each of which is composed of a label switched path ID (Lsp ID) field 201, an Er-Hops field 210, a preemption priority field 203, a protection field 205, and a QoS index field 207. The respective entries of the path profile 200 are indexed. The Lsp ID field 201 is used to store an ID of an LSP set up according to the present invention. The preemption priority field 203 is used to indicate a priority for path resetup or path maintenance when a set-up CR-LSP is insufficient in resources or fails. Where a set-up CR-LSP is insufficient in resources or fails during transmission of a packet therethrough, a determination is made, on the basis of the priority of the preemption priority field 203, as to whether the LSP must be reset up or should be maintained as is. It should be noted herein that a preemption TLV of a CR-LDP is determined on the basis of the priority of the preemption priority field 203. The protection field 205 is used to indicate whether a bypass path has been set up for path protection. Provided that a bypass path has been set up, a priority index set in the path index[8] TBL field 117 (FIG. 3A) of the subscriber profile 110 will be stored in the protection field 205 of FIG. 4. The QoS index field 207 is assigned an index of a QoS profile linked to the path profile 200.

Information relative to the path profile 200 is referred to for setting a parameter of an MPLS signal protocol message, more particularly, a type length value (TLV) of a CR-LDP. An explicit routed type length value (ER-TLV) of a CR-LDP, preferably, includes a plurality of ER-Hop TLVs. The ER-Hop represents a collection of routers on a given path. The ER-Hop TLVs have their contents composed of information relative to the Er-Hops field 210, which is a sub-table of the path profile 200. In the present embodiment, the number of ER-Hop TLV entries in the ER-TLV that can be encoded for one CR-LDP is limited to 50 at a maximum. The Er-Hops field 210 includes an IP address (Addr) field 211, a prefix length field 213, and a setup mode field 215. The IP Addr field 211 is used to indicate an IP address, and the prefix length field 213 is used to represent a prefix length of the IP address. The setup mode field 215 is used to represent a setup mode for each entry of the Er-Hops field 210 that defines an L bit of each ER-Hop TLV. In this embodiment, the setup mode field 215, preferably, has two mode values, a strict mode value and a loose mode value. The L bit is set to 0 when the setup mode field 215 has the strict mode value, and is set to 1 when it has the loose mode value. Upon receiving a label request message, a specific node determines, with reference to an L bit value of a given ER-Hop TLV and an IP address into which the ER-Hop TLV is encoded, whether its ID is present in the received message.

FIG. 5 is a view showing the structure of a quality of service (QoS) profile in accordance with the present invention. The QoS profile 300 is provided to manage the QoS that an ISP provides to subscribers in the form of information by categories. The QoS profile 300 includes a plurality of entries, each of which is composed of a service category field 301, a frequency field 303, a peak data rate (PDR) field 305, a peak bucket size (PBS) field 307, a committed data rate (CDR) field 309 and a committed bucket size (CBS) field 311. Values of the fields of the QoS profile comprise information constituting a signal protocol parameter, more particularly, a traffic TLV in a CR-LDP message.

The traffic TLV is composed of a flag field, a frequency field, a weight field, a peak data rate (PDR) field, a peak bucket size (PBS) field, a committed data rate (CDR) field, a committed bucket size (CBS) field, and an excess burst size (EBS) field. The frequency field of the traffic TLV has a value defined by the value of the frequency field 303 of the QoS profile 300. The PDR field and the PBS field of the TLV have values defined by the values of the PDR field 305 and the PBS field 307, respectively, of the QoS profile 300. The CDR and CBS fields of the TLV have values defined by the values of the CDR field 309 and the CBS field 311, respectively, of the QoS profile 300.

An operator allocates QoS parameters based on respective categories of services predefined by the ISP for the entries of the QoS profile. Thereafter, the operator configures setup information of a CR-LSP for provision of a desired service to a subscriber by assigning an index of a corresponding entry of the QoS profile to a path profile entry linked to a subscriber profile entry where FEC information of the subscriber is defined.

In the present embodiment, the number of configurable entries of the QoS profile is 100 at a maximum. Therefore, the MPLS system can finely control and manage QoS information and can positively cope with a variety of network resources requirements of users. It should be noted that one QoS profile entry can be linked to a plurality of subscriber profile entries.

The subscriber profile, the path profile and the QoS profile with the above-stated structures can be created and managed in the following manner. The entries of the subscriber profile are created at a time or each time a new subscriber is entered. A traffic engineering service subscriber is assigned a unique ID, preferably, any value numbered within the range of 1 to 7999, such that he/she is managed on the basis of the assigned ID. The number 0 is a reserved value, and is not used. One subscriber ID can manage a maximum of four subscriber profile entries, each being created for one service. The management of four subscriber profile entries by one subscriber ID enables the MPLS system to provide a variety of services to a subscriber, and to manage those services, using one subscriber ID. Each entry of the subscriber profile is created on the basis of FEC information containing a source address, a source address prefix length, a destination address, and a destination address prefix length, and on the basis of extended FEC information containing a source port number, a destination port number, a source ID and a destination ID. The extended FEC information is used for the provision of a real-time service or emulated leased line service. Note that the extended FEC information cannot be obtained from a signal protocol message for LSP setup.

Path profile entries are created on the basis of path information previously recognized by an operator at a time when the system is initialized, and then used as basic information for ER-LSP setup. These path profile entries are indexed with corresponding numbers from 0 to 65535 for distinction from one another. In the case where path related information is modified, each path profile entry performs an associated operation with reference to a corresponding index. The path profile entries can be created as needed, and are then linked to previously created subscriber profile entries to become basic information for ER-/CR-LSP setup.

QoS profile entries are created in units of QoS categories previously classified by an operator, and are then indexed with unique numbers. Referring to these indexes, the operator can readily perform associated tasks when specific entries of the QoS profile are modified or deleted.

The subscriber profile, the path profile and the QoS profile have a significant interrelationship through the interlinking thereof after associated information is entered by an operator. Information as to the related profiles is used for ER-/CR-LSP setup, release and modification based on traffic engineering considerations. The inter-profile linking is established by allowing the operator to enter indexes of profiles to be related, so as to interconnect the profile entries. The indexes assigned to the respective profile entries are media for maintenance of the inter-profile linking. The relationship among the respective profile entries is released by initializing a specific index in a corresponding entry.

Figure 6:
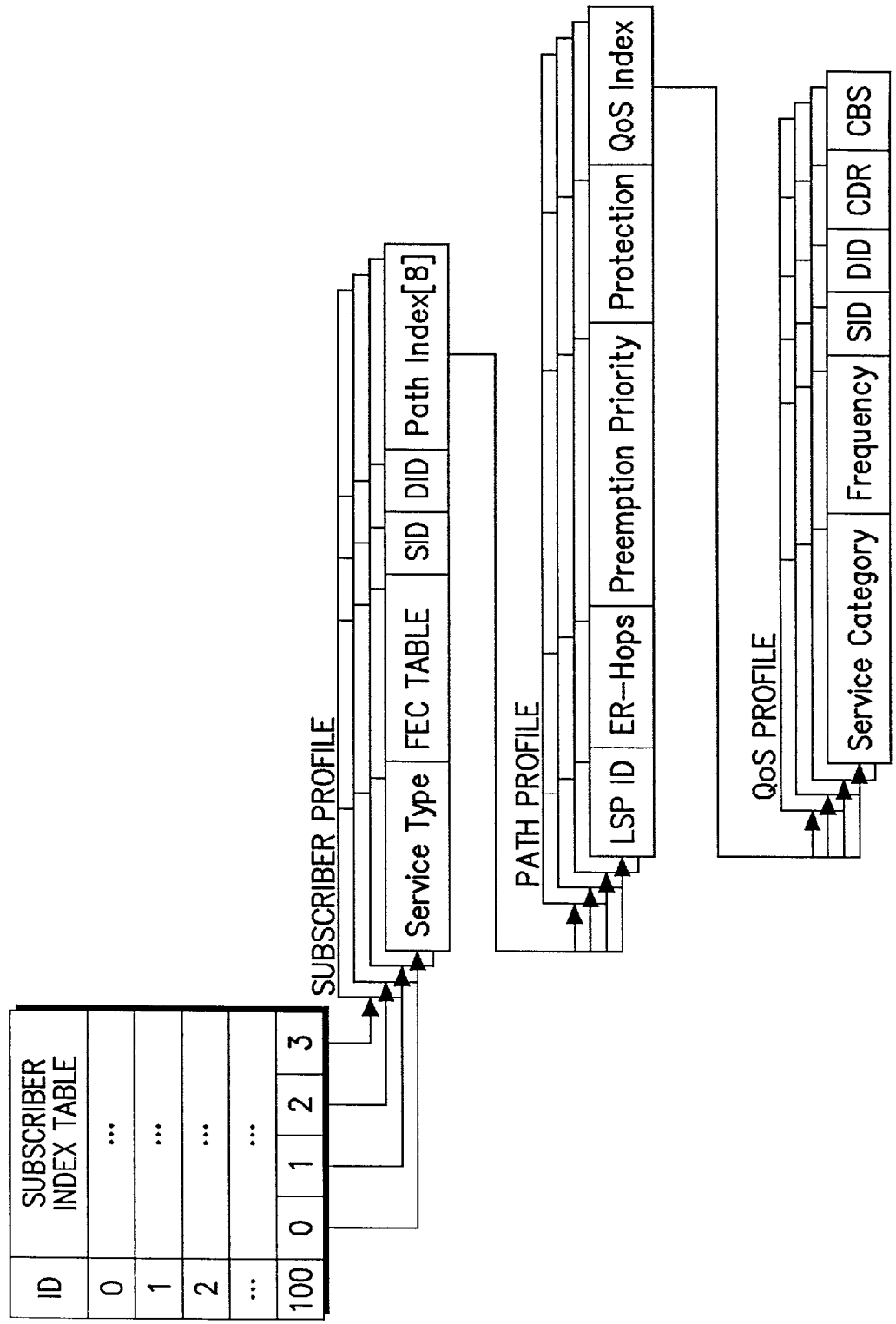
FIG. 6 is a view showing logical structures of entries of profiles linked according to the present invention.

FIG. 6 is a view showing profiles interlinked after being created. That is, FIG. 6 is a view showing logical structures of entries of profiles linked according to the present invention, and more particularly, the interlinking of the subscriber index table, the subscriber profile, the path profile and the QoS profile based on a subscriber ID.

A detailed description will hereinafter be given, with reference to FIGS. 7 and 8, of the procedures for setting up and releasing an LSP using information as to profiles linked as shown in FIG. 6. The LSP setup and release based on traffic engineering considerations are carried out under the control of the TEOCFB 30 (FIG. 2) in the LER.

Figure 7:
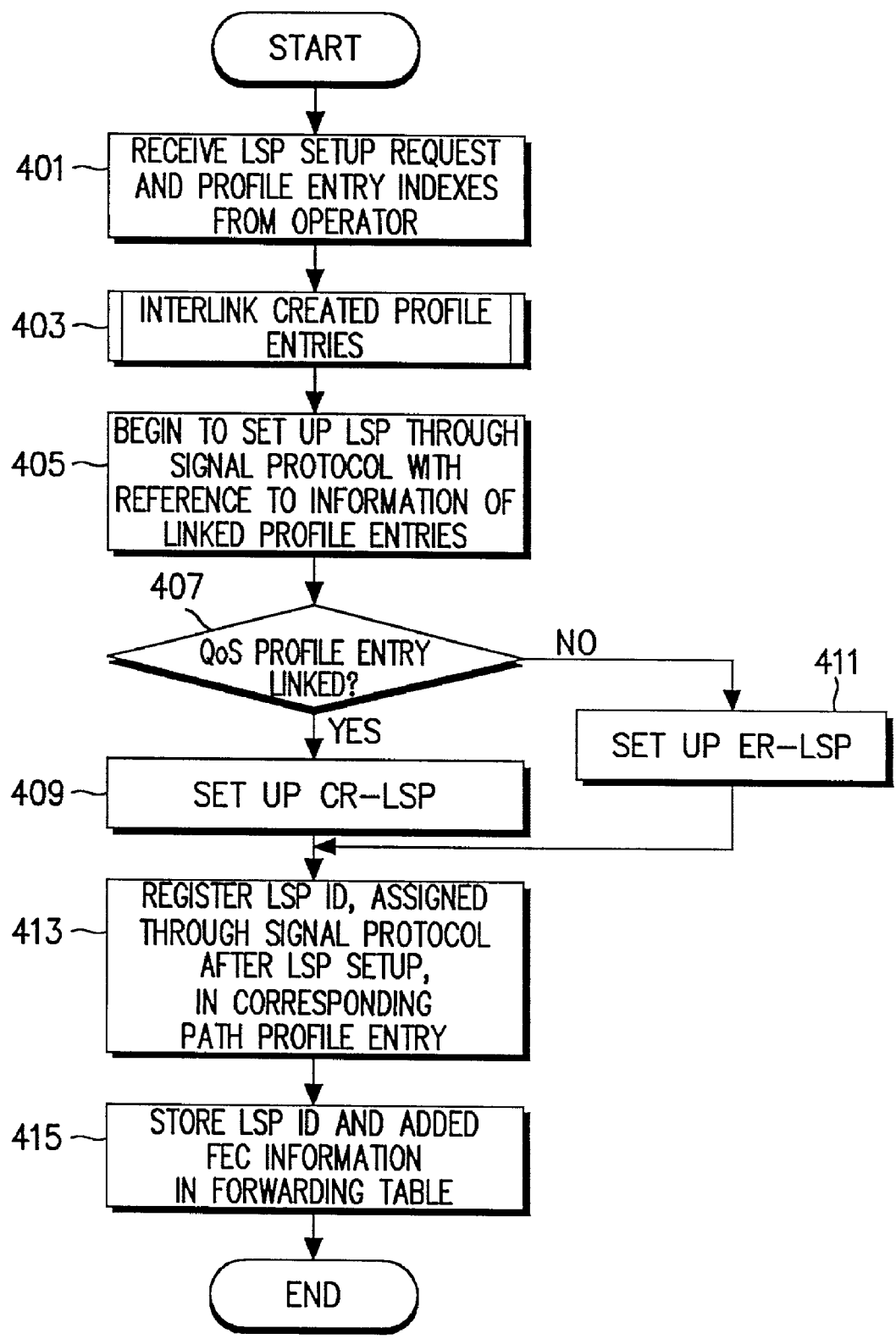
FIG. 7 is a flowchart illustrating an LSP setup operation of a traffic engineering operating and controlling function block (TEOCFB) in accordance with the present invention.

FIG. 7 is a flowchart illustrating the LSP setup operation of the TEOCFB 30 in accordance with the present invention. First, under the condition that the respective profiles are created and stored in the TEDB 37, the TEOCFB 30 receives an LSP setup request and respective profile entry indexes from an operator at step 401. In response to the received LSP setup request, the TEOCFB 30 interlinks the created profile entries through the TEPFB 35 according to the received indexes at step 403, and then proceeds to step 405. At step 405, the TEOCFB 30 begins to set up an LSP through a signal protocol with reference to information as to the linked profile entries, and then proceeds to step 407. In the present embodiment, the information referred to for the LSP setup, preferably, is FET information as to the subscriber profile, ER-Hop information as to the path profile, and signal protocol parameter information as to the QoS profile. At step 407, the TEOCFB 30 checks a QoS index field of the referred path profile entry to determine whether a linked QoS profile entry is present. When a linked QoS profile entry is present, the TEOCFB 30 moves to step 409. Otherwise, the TEOCFB 30 proceeds to step 411. At step 409, the TEOCFB 30 sets up a CR-LSP and then moves to step 413. At step 411, the TEOCFB 30 sets up an ER-LSP and then proceeds to step 413. At step 413, the TEOCFB 30 is assigned an ID of the LSP set up at the previous step 409 or 411 through a signal protocol, and registers the assigned ID in an Lsp ID field of a corresponding path profile entry through the TEPFB 35. The LSP ID is used for reference in the LSP release or modification. Thereafter, the TEOCFB 30 stores the LSP ID and added FEC information in a forwarding table at step 415, and then ends the LSP setup operation.

Figure 8:
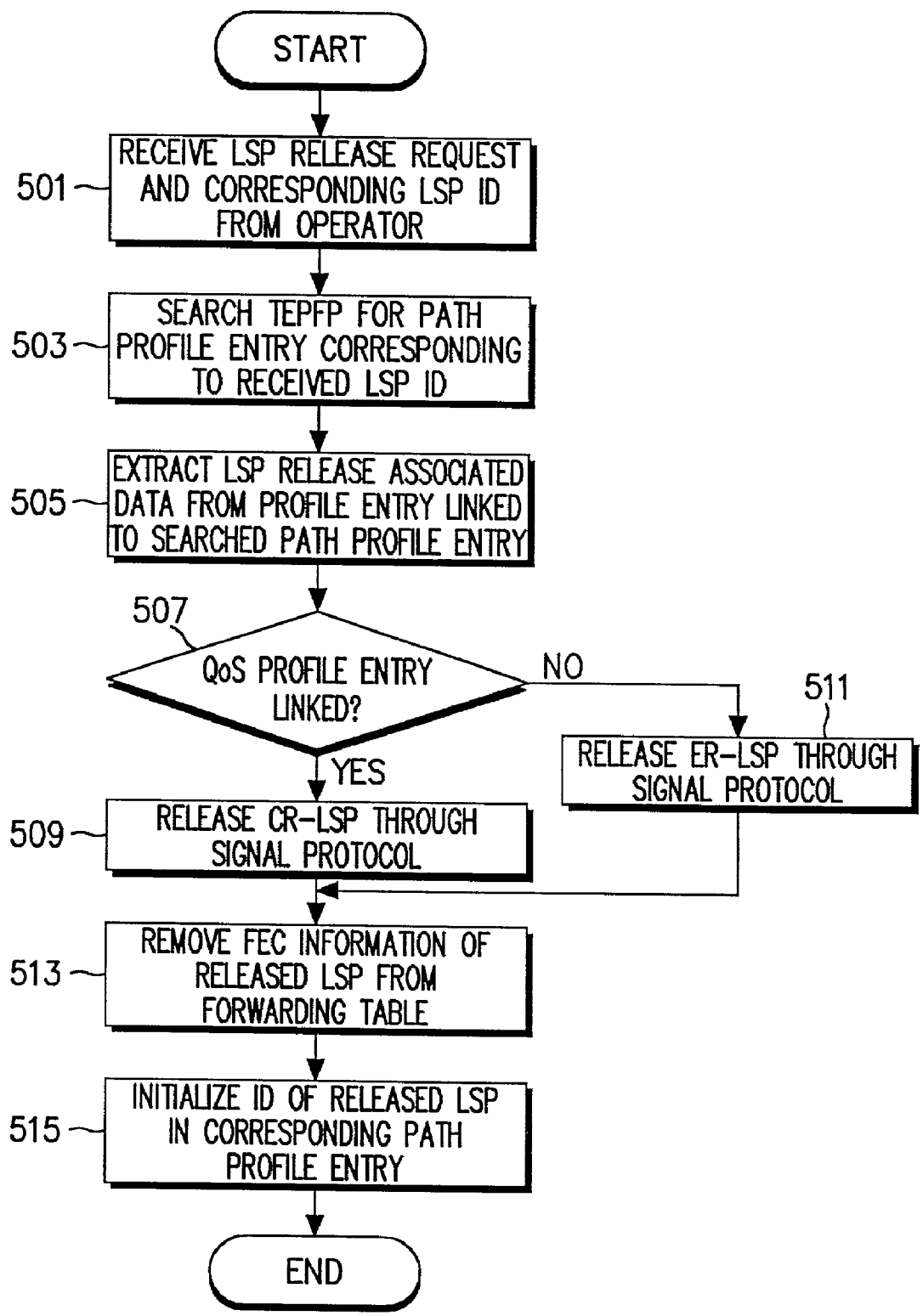
FIG. 8 is a flowchart illustrating an LSP release operation of the TEOCFB in accordance with the present invention.

FIG. 8 is a flowchart illustrating the LSP release operation of the TEOCFB 30 in accordance with the present invention. First, the TEOCFB 30 receives an LSP release request and a corresponding LSP ID from an operator at step 501. In response to the received LSP release request, the TEOCFB 30 searches the TEPFP for a path profile entry corresponding to the received LSP ID at step 503, and then moves to step 505. At step 505, the TEOCFB 30 extracts LSP release associated data from a profile entry linked to the searched path profile entry, and then moves to step 507. In this embodiment, the extracted data, preferably, is FEC information as to a linked subscriber profile entry, parameter information as to a signal protocol applied to the corresponding LSP, as to a linked QoS profile entry, etc. At step 507, the TEOCFB 30 checks a QoS index field of the corresponding path profile entry to determine whether a linked QoS profile entry is present. When a linked QoS profile entry is present, the TEOCFB 30 moves to step 509. Otherwise, the TEOCFB 30 proceeds to step 511. At step 509, the TEOCFB 30 releases a CR-LSP through a signal protocol, and then moves to step 513. At step 511, the TEOCFB 30 releases an ER-LSP through a signal protocol, and then proceeds to step 513. At step 513, the TEOCFB 30 removes FEC information as to the released LSP from a forwarding table, and then proceeds to step 515. Thereafter, at step 515, the TEOCFB 30 initializes the ID of the released LSP, or the LSP ID received at the above step 501, in the corresponding path profile entry through the TEPFP, and then ends the LSP release operation.

As described above, subscriber information and service information for provision of the traffic engineering service in the MPLS system are classified into three profiles, each having a plurality of table entries. Thus, the MPLS system can accommodate and individually manage a variety of subscriber and service associated information, and can provide high-quality traffic engineering service on the basis of the various accommodated information.

As apparent from the above description, according to the present invention, profiles are created and managed according to three types of information, subscriber information, path information and QoS information, thereby enabling an operator to set up, release or modify an ER/CR-LSP without any complex input procedures, in order to provide a desired service to a subscriber. In particular, an MPLS system can provide desired services to subscribers on the basis of subdivided QoS information, so as to provide a variety of high-quality traffic engineering services, which were previously not able to be conventionally provided. Further, in the MPLS system, lower-order function blocks are able to obtain desired higher-order information by referring to profiles without requiring information from the operator, and are able to perform their respective functions on the basis of the obtained information. For example, for a signal protocol message for the transfer of label information for LSP setup, parameters to be included in the message can be extracted from respective profile entries with reference only to indexes entered by the operator, and such parameters do not have to be obtained from inputs by the operator. Furthermore, added FEC information incapable of being obtained from a signal protocol can be extracted from profiles to constitute a forwarding table for packet transmission. Moreover, a protection path control function is performed in order to determine whether to switch traffic to a bypass path or to set up a new path upon occurrence of a fault with reference to information as to a path profile linked to one subscriber profile entry.

Although the preferred embodiments of the present invention have been described, it will be understood by those skilled in the art that the present invention should not be limited to the described preferred embodiment. Rather, various changes and modifications can be made within the spirit and scope of the present invention, as defined by the following claims.

What is claimed is:

1. A method for setting a label switched path (LSP) in a multiprotocol label switching system implementing a traffic engineering function, comprising:

receiving a request for setting the LSP including entry indexes of a previously stored plurality of profiles;

interlinking entries of a corresponding profile in accordance with the received entry indexes;

setting up the LSP referring to information of linked profiles, wherein the plurality of profiles include a subscriber profile including a plurality of entries for storing forwarding equivalence class (FEC) information required for setup of the label switched path (LSP) based on the traffic engineering function, said subscriber profiles being sequentially assigned indexes corresponding to a given traffic engineering service subscriber identification (ID);

a path profile including a plurality of entries for storing respective items of path information regarding a type length value (TLV) of a signal protocol required for setup of an explicit routed label switched path (ER-LSP) based on the traffic engineering function, said entries of said path profile being sequentially assigned indexes corresponding to the respective items of the path information; and a quality of service (QoS) profile including a plurality of entries for storing respective items of QoS information regarding a TLV of a signal protocol required for setup of a constraint routed label switched path (CR-LSP) based on the traffic engineering function, said entries of said QoS profile being sequentially assigned indexes corresponding to the respective items of QoS information.

2. The method as set forth in claim 1, wherein said indexes assigned to said profile entries include a plurality of indexes set by an operator for interlinking corresponding ones of said entries of said subscriber profile, said entries of said path profile, and said entries of said QoS profile.

3. The method as set forth in claim 1, wherein each of said entries of said subscriber profile includes:

a field for storing information about a type of a network service desired by a subscriber;

an FEC table field having a plurality of entries, said entries of said FEC table field containing a plurality of FEC information items corresponding to network service type and being sequentially assigned indexes corresponding respectively to the plurality of FEC information items;

a field for use, when an Internet protocol packet to be sent by a longest prefix matching method cannot be forwarded for an emulated leased line service, in storing an identifier of a source address of the Internet protocol packet;

a field for use, when the Internet protocol packet to be sent by the longest prefix matching method cannot be forwarded for the emulated leased line service, in storing an identifier of a destination address of said Internet protocol packet; and a path index table field for storing indexes of certain ones of said entries of said path profile linked to a corresponding one of said entries of said subscriber profile.

4. The method as set forth in claim 3, wherein each of said entries of said subscriber profile is linked to plural ones of said entries of said path profile, each of the linked entries of said path profile having an index assigned a priority and stored in said path index table field for setup of a bypass path.

5. The method as set forth in claim 3, wherein each of said entries of said FEC table field includes:

a field for storing a source port number available in a higher-order application program for a real-time service;

a field for storing a destination port number available in the higher-order application program for the real-time service;

an address table field having a plurality of entries, said entries of said address table field storing a plurality of address information items and being sequentially assigned indexes corresponding to respective ones of the address information items; and a field for storing information about a number of said entries of said address table field.

6. The method as set forth in claim 5, wherein each of said entries of said address table field includes:

a field for storing said source address of said Internet protocol packet to be sent;

a field for storing information about a prefix length of said source address;

a destination address table field having a plurality of entries, said entries of said destination address table field containing a plurality of respective destination address information items of said Internet protocol packet to be sent, and being sequentially assigned indexes corresponding to the respective destination address information items; and a field for storing information about a number of said entries in said destination address table field.

7. The method as set forth in claim 6, wherein each of said entries of said destination address table field includes:

a field for storing said destination address of said Internet protocol packet to be sent; and a field for storing information about a prefix length of said destination address.

8. The method as set forth in claim 1, wherein each of said entries of said path profile includes:

a field for storing an identifier of a label switched path set-up according to the traffic engineering function;

an explicit routed-hop table field having a plurality of entries, said entries of said explicit routed-hop table field storing a plurality of explicit routed-hop type length value (ER-Hop TLV) determination information items and being sequentially assigned indexes corresponding to respective ones of the ER-Hop TLV determination information items;

a field for storing information determining a preemption TLV of a signal protocol;

a field for storing information about a bypass path priority of a corresponding one of said entries of said path profile linked to a certain one of said entries of said subscriber profile; and a field for storing an index of a given one of said entries of said Qos profile linked to a corresponding entry of the path profile.

9. The method as set forth in claim 1, wherein each of said entries of said QoS profile entries includes:

a field for storing information about a QoS category;

a field for storing information determining a frequency of a traffic TLV of a signal protocol;

a field for storing information determining a peak data rate of said traffic TLV;

a field for storing information determining a peak bucket size of said traffic TLV;

a field for storing information determining a committed data rate of said traffic TLV; and a field for storing information determining a committed bucket size of said traffic TLV.

10. A Lable Edge Router (LER) in a multiprotocol label switching system implementing a traffic engineering function, said label edge router (LER) comprising:

a database for storing a subscriber profile including a plurality of entries for storing forwarding equivalence class (FEC) information required for setup of a label switched path (LSP) based on the traffic engineering function, said subscriber profiles being sequentially assigned indexes corresponding to a given traffic engineering service subscriber identification (ID);

a path profile including a plurality of entries for storing respective items of path information regarding a type length value (TLV) of a signal protocol required for setup of an explicit routed label switched path (ER-LSP) based on the traffic engineering function, said entries of said path profile being sequentially assigned indexes corresponding to the respective items of the path information; and a quality of service (QoS) profile including a plurality of entries for storing respective items of QoS information regarding a TLV of a signal protocol required for setup of a constraint routed label switched path (CR-LSP) based on the traffic engineering function, said entries of said QoS profile being sequentially assigned indexes corresponding to the respective items of QoS information; and a traffic engineering operating and controlling function block (TEOCFB) which, upon receipt of the LSP setup request including entry indexes of respective profiles, interlinks the entry of each profile in accordance with the received entry index and sets up the LSP referring to information of the linked profile.

11. The label edge router of claim 10, wherein said indexes assigned to said profile entries include a plurality of indexes set by an operator for interlinking corresponding ones of said entries of said subscriber profile, said entries of said path profile, and said entries of said QoS profile.

12. The label edge router of claim 10, wherein each of said entries of said subscriber profile includes:

a field for storing information about a type of a network service desired by a subscriber;

an FEC table field having a plurality of entries, said entries of said FEC table field containing a plurality of FEC information items corresponding to network service type and being sequentially assigned indexes corresponding respectively to the plurality of FEC information items;

a field for use, when an Internet protocol packet to be sent by a longest prefix matching method cannot be forwarded for an emulated leased line service, in storing an identifier of a source address of the Internet protocol packet;

a field for use, when the Internet protocol packet to be sent by the longest prefix matching method cannot be forwarded for the emulated leased line service, in storing an identifier of a destination address of said Internet protocol packet; and a path index table field for storing indexes of certain ones of said entries of said path profile linked to a corresponding one of said entries of said subscriber profile.

13. The label edge router of claim 12, wherein each of said entries of said subscriber profile is linked to plural ones of said entries of said path profile, each of the linked entries of said path profile having an index assigned a priority and stored in said path index table field for setup of a bypass path.

14. The label edge router of claim 12, wherein each of said entries of said FEC table field includes:

a field for storing a source port number available in a higher-order application program for a real-time service;

a field for storing a destination port number available in the higher-order application program for the real-time service;

an address table field having a plurality of entries, said entries of said address table field storing a plurality of address information items and being sequentially assigned indexes corresponding to respective ones of the address information items; and a field for storing information about a number of said entries of said address table field.

15. The label edge router of claim 14, wherein each of said entries of said address table field includes:

a field for storing said source address of said Internet protocol packet to be sent;

a field for storing information about a prefix length of said source address;

a destination address table field having a plurality of entries, said entries of said destination address table field containing a plurality of respective destination address information items of said Internet protocol packet to be sent, and being sequentially assigned indexes corresponding to the respective destination address information items; and a field for storing information about a number of said entries in said destination address table field.

16. The label edge router of claim 15, wherein each of said entries of said destination address table field includes:

a field for storing said destination address of said Internet protocol packet to be sent; and a field for storing information about a prefix length of said destination address.

17. The label edge router of claim 10, wherein each of said entries of said path profile includes:

a field for storing an identifier of a label switched path set-up according to the traffic engineering function;

an explicit routed-hop table field having a plurality of entries, said entries of said explicit routed-hop table field storing a plurality of explicit routed-hop type length value (ER-Hop TLV) determination information items and being sequentially assigned indexes corresponding to respective ones of the ER-Hop TLV determination information items;

a field for storing information determining a preemption TLV of a signal protocol;

a field for storing information about a bypass path priority of a corresponding one of said entries of said path profile linked to a certain one of said entries of said subscriber profile; and a field for storing an index of a given one of said entries of said QoS profile linked to a corresponding entry of the path profile.

18. The label edge router of claim 10, wherein each of said entries of QoS profile entries includes:
a field for storing information about a QoS category;
a field for storing information determining a frequency of a traffic TLV of a signal protocol;
a field for storing information determining a peak data rate of said traffic TLV;
a field for storing information determining a peak bucket size of said traffic TLV;
a field for storing information determining a committed data rate of said traffic TLV; and
a field for storing information determining a committed bucket size of said traffic TLV.

19. A label switched path (LSP) setup method, comprising the steps of:
(a) storing a plurality of profiles including entries associated with stored information corresponding respectively to a plurality of FEC information, a plurality of ER-LSP setup information, and a plurality of QoS information, wherein the plurality of profiles correspond respectively to the plurality of FEC information, the plurality of ER-LSP setup information, and the plurality of QoS information;
(b) receiving an LSP setup request and profile entry indexes;
(c) interlinking created profile entries in accordance with the received profile and indexes;
(d) checking a quality of service (QoS) index field to determine whether a linked QoS profile entry is present; and
(e) setting up the LSP based on the determination of step (d).

20. The method of claim 19, further comprising the step, between steps (c) and (d), of commencing setup of the LSP through signal protocol with reference to information as to linked profile entries.

21. The method of claim 19, wherein step (e) comprises the step of setting up a constraint routed label switched path (CR-LSP) when the linked QoS profile entry is present.

22. The method of claim 19, wherein step (e) comprises the step of setting up an explicit routed label switched path (ER-LSP) when the linked QoS profile entry is not present.

23. The method of claim 19, further comprising step (f) of registering an LSP identifier, assigned through a signal protocol, in a corresponding path profile entry.

24. The method of claim 23, further comprising step (g) of storing the LSP identifier and forwarding equivalence class (FEC) information in a forwarding table.

25. A label switched path (LSP) release method, comprising the steps of:
(a) storing a plurality of profiles including entries associated with stored information corresponding respectively to a plurality of FEC information, a plurality of ER-LSP setup information, and a plurality of QoS information, wherein the plurality of profiles correspond respectively to the plurality of FEC information, the plurality of ER-LSP setup information, and the plurality of QoS information;
(b) receiving a LSP release request and a corresponding LSP identifier;
(c) searching for a path profile entry corresponding to the received LSP identifier;
(d) extracting LSP release data from a profile entry linked to the searched path profile entry;
(e) checking a quality of service (QoS) index field in order to determine whether a linked QoS profile entry is present; and
(f) releasing the LSP based on the determination of step (e).

26. The method of claim 25, wherein a constraint routed label switched path (CR-LSP) is released when the linked QoS profile entry is present.

27. The method of claim 25, wherein an explicit routed label switched path (ER-LSP) is released when the linked QoS profile entry is not present.

28. The method of claim 25, further comprising step (g) of removing forwarding equivalence class (FEC) information of the released LSP from a forwarding table.

29. The method of claim 28, further comprising step (h) of initializing the identifier of the released LSP in a corresponding path profile entry.

30. The method of claim 25, further comprising step (g) of initializing the identifier of the released LSP in a corresponding path profile entry.

31. A label switched path (LSP) setup method, comprising the steps of:
(a) receiving an LSP setup request and profile entry indexes;
(b) interlinking created profile entries in accordance with the received profile and indexes;
(c) checking a quality of service (QoS) index field to determine whether a linked QoS profile entry is present; and
(d) setting up the LSP based on the determination of step (c);
wherein step (d) comprises the step of setting up an explicit routed label switched path (ER-LSP) when the linked QoS profile entry is not present.

32. A label switched path (LSP) release method, comprising the steps of:
(a) receiving a LSP release request and a corresponding LSP identifier;
(b) searching for a path profile entry corresponding to the received LSP identifier;
(c) extracting LSP release data from a profile entry linked to the searched path profile entry;
(d) checking a quality of service (QoS) index field in order to determine whether a linked QoS profile entry is present; and
(e) releasing the LSP based on the determination of step (d);
wherein an explicit routed label switched path (ER-LSP) is released when the linked QoS profile entry is not present.

33. A label switched path (LSP) release method, comprising the steps of:
(a) receiving a LSP release request and a corresponding LSP identifier;
(b) searching for a path profile entry corresponding to the received LSP identifier;
(c) extracting LSP release data from a profile entry linked to the searched path profile entry;
(d) checking a quality of service (QoS) index field in order to determine whether a linked QoS profile entry is present;
(e) releasing the LSP based on the determination of step (d); and
(f) initializing the identifier of the released LSP in a corresponding path profile entry.

* * * * *